United States Patent
Yoo et al.

(10) Patent No.: US 10,235,299 B2
(45) Date of Patent: Mar. 19, 2019

(54) METHOD AND DEVICE FOR PROCESSING DATA

(71) Applicant: SAMSUNG ELECTRONICS CO., LTD., Suwon-si, Gyeonggi-Do (KR)

(72) Inventors: Dong-Hoon Yoo, Suwon-si (KR); Nam-Hyung Kim, Seoul (KR); Jun-Whan Ahn, Seoul (KR); Ki-Young Choi, Seoul (KR)

(73) Assignees: SAMSUNG ELECTRONICS CO., LTD., Suwon-si, Gyeonggi-Do (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 15/723,806

(22) Filed: Oct. 3, 2017

(65) Prior Publication Data
US 2018/0129259 A1  May 10, 2018

Related U.S. Application Data

(60) Provisional application No. 62/418,551, filed on Nov. 7, 2016.

(30) Foreign Application Priority Data

Jan. 9, 2017  (KR) .................. 10-2017-0003050

(51) Int. Cl.
| | |
|---|---|
| *G06F 12/00* | (2006.01) |
| *G06F 12/0893* | (2016.01) |
| *G06F 12/08* | (2016.01) |
| *G06F 1/324* | (2019.01) |
| *G06F 1/3234* | (2019.01) |

(Continued)

(52) U.S. Cl.
CPC .......... *G06F 12/0893* (2013.01); *G06F 1/324* (2013.01); *G06F 1/3275* (2013.01); *G06F 12/08* (2013.01); *G06F 12/0848* (2013.01); *G06F 12/0895* (2013.01); *G06F 2212/225* (2013.01); *G06F 2212/282* (2013.01)

(58) Field of Classification Search
None
See application file for complete search history.

(56) References Cited

U.S. PATENT DOCUMENTS

| | | |
|---|---|---|
| 6,865,647 B2 | 3/2005 | Olarig et al. |
| 8,843,705 B2 | 9/2014 | Li et al. |

(Continued)

FOREIGN PATENT DOCUMENTS

KR    10-1480424    1/2015

OTHER PUBLICATIONS

Beckmann et al., "Jigsaw: Scalable Software-Defined Caches", IEEE, 2013, pp. 213-224.

(Continued)

*Primary Examiner* — Daniel D Tsui
(74) *Attorney, Agent, or Firm* — F. Chau & Associates, LLC

(57) ABSTRACT

A method of processing data including receiving data to be stored in a first group of cache banks from among a plurality of cache banks corresponding to a plurality of cores. The method further includes partitioning the received data and transmitting the partitioned data to the first group of cache banks according to a write intensity of the received data, and storing a portion of the transmitted data in a first cache bank from among the first group of cache banks.

20 Claims, 10 Drawing Sheets

(51) Int. Cl.
*G06F 12/0846* (2016.01)
*G06F 12/0895* (2016.01)

(56) References Cited

U.S. PATENT DOCUMENTS 9,304,913 B2   4/2016   Dong et al.
9,472,248 B2   10/2016  Wilkerson et al.

OTHER PUBLICATIONS

Ahn et al., "Prediction Hybrid Cache: An Energy-Efficient STT-Ram Cache Architecture", IEEE Transactions on Computers, vol. 65, No. 3, Mar. 2016, pp. 940-951.
Li et al., "STT-Ram based Energy-Efficiency Hybrid Cache for CMPs", IEEE, 2011, pp. 31-36.
Wu et al., "Hybrid Cache Architecture with Disparate Memory Technologies", ISCA, 2009, pp. 34-45.

METHOD AND DEVICE FOR PROCESSING DATA

CROSS-REFERENCE TO RELATED APPLICATION

This application claims priority under 35 U.S.C § 119 of U.S. Patent Application No. 62/418,551, filed on Nov. 7, 2016, in the U.S. Patent and Trademark Office, and Korean Patent Application No. 10-2017-0003050, filed on Jan. 9, 2017, in the Korean Intellectual Property Office, the disclosures of which are incorporated by reference herein in their entireties.

TECHNICAL FIELD

The present inventive concept relates to a method and device for processing data.

DISCUSSION OF THE RELATED ART

A method of increasing a clock frequency of a system core has been used to improve the performance of a computer or a computing system. However, once a clock frequency of a core increases, power consumption by the system core and heat radiating from the system core also increase. Efforts to improve the performance of a computer or a computing system by increasing the clock frequency of a core have recently declined due to the previously mentioned effects. Accordingly, a method of increasing the number of cores is being used to improve the performance of a computing system or a computer.

However, a method of processing data by using a plurality of cores might not perform optimally because of the characteristics of a cache being used. In general, the term 'cache' refers to a relatively small memory mounted in or around a central processing unit (CPU) chip to speed up the access to a main memory having a large capacity. Since a processing speed of a CPU tends to increase faster than a speed to access a memory, a cache having a relatively small capacity and a high speed directly affects the performance of a processor.

SUMMARY

According to an exemplary embodiment of the present inventive concept, a method of processing data including receiving data to be stored in a first group of cache banks from among a plurality of cache banks corresponding to a plurality of cores. The method further includes partitioning the received data and transmitting the partitioned data to the first group of cache banks according to a write intensity of the received data, and storing a portion of the transmitted data in a first cache bank from among the first group of cache banks.

According to an exemplary embodiment of the present inventive concept, a device for processing data including a receiver configured to receive data to be stored in a first group of cache banks from among a plurality of cache banks corresponding to a plurality of cores. The device further includes a processor configured to partition the received data and to transmit the partitioned data to the first group of cache banks according to a write intensity of the received data. The device additionally includes a first cache bank configured to store a portion of the transmitted data, wherein the first cache bank is from among the first group of cache banks.

According to an exemplary embodiment of the present inventive concept, A non-transitory computer-readable recording medium having embodied thereon a program for executing the method.

According to an exemplary embodiment of the present inventive concept, a method of processing data including receiving data by using a receiver, dividing the received data, and transmitting the divided data to a first group of cache banks of a plurality of cache banks. The method further includes storing a portion of the transmitted data in one memory of a plurality of memories included in a first cache bank of the first group of cache banks based on a write intensity of the portion of the transmitted data.

BRIEF DESCRIPTION OF THE DRAWINGS

The above and other features of the present inventive concept will become more apparent by describing in detail exemplary embodiments thereof, with reference to the accompanying drawings, in which.

DETAILED DESCRIPTION OF THE EMBODIMENTS

Exemplary embodiments of the present inventive concept will be described more fully hereinafter with reference to the accompanying drawings. The present inventive concept may, however, be embodied in many different forms and should not be construed as limited to the exemplary embodiments set forth herein.

It will be understood that although the terms 'first', 'second', etc. may be used herein to describe various components and/or elements, these components and/or elements should not be limited by these terms. These terms are only used to distinguish one component or element from another component or element.

The exemplary embodiments of the present inventive concept relate to a rendering method and device.

Figure 1:
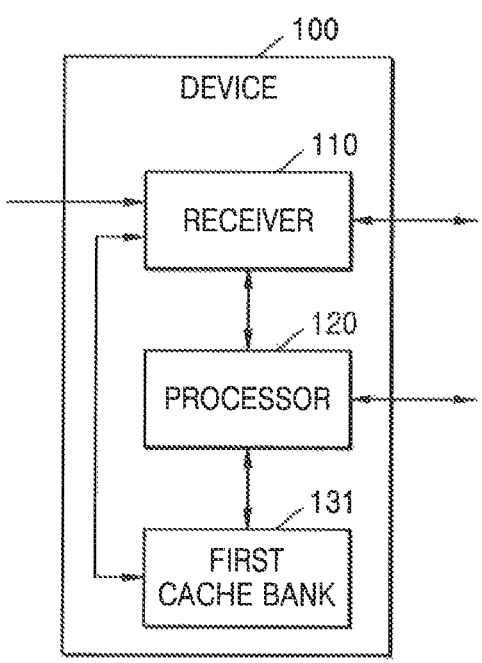
FIG. 1 is a block diagram of a device according to an exemplary embodiment of the present inventive concept.

FIG. 1 is a block diagram of a device 100 according to an exemplary embodiment of the present inventive concept. It will be understood by one of ordinary skill in the art that elements other than elements illustrated in FIG. 1 may be further included in the device 100.

Referring to FIG. 1, the device 100 may include a receiver 110, a processor 120, and a first cache bank 131.

When data is processed by using a plurality of cores, the device 100 may correspond to one core from among a plurality of cores. For example, one core from among the plurality of cores and the device 100 may be included in one tile. The term 'tile' according to an exemplary embodiment of the present inventive concept may refer to a data processing unit including a core and a cache bank. The term 'cache bank' according to an exemplary embodiment of the present inventive concept may refer to, when a cache is distributed at a plurality of locations, each part of the distributed cache. The term 'distributed cache method' according to an exemplary embodiment of the present inventive concept may refer to a method of distributing a cache at a plurality of locations.

The receiver 110 may receive data from the outside (e.g., an external device) of the device 100. For example, the receiver 110 according to an exemplary embodiment of the present inventive concept may receive data to be stored in some cache banks (e.g., a first group of cache banks) from among a plurality of cache banks corresponding to the plurality of cores.

The first cache bank 131, according to an exemplary embodiment of the present inventive concept, may be one cache bank from among the plurality of cache banks corresponding to the plurality of cores. The first cache bank 131, according to an exemplary embodiment of the present inventive concept, may obtain data from the receiver 110 and may store the data therein. For example, the receiver 110 may transmit data to the first cache bank 131, and the first cache bank 131 may store the transmitted data. The first cache bank 131, according to an exemplary embodiment of the present inventive concept, may include a plurality of memories with different write characteristics, and the first cache bank 131 may receive and store some of data received by the receiver 110.

The processor 120, according to an exemplary embodiment of the present inventive concept, may control the receiver 110 and the first cache bank 131. The processor 120 may partition and transmit data to some cache banks, according to a write intensity of data received by the receiver 110. In addition, the processor 120 may control the first cache bank 131 to store transmitted data in one memory from among the plurality of memories included in first the cache bank 131, according to a write intensity of the data transmitted to the first cache bank 131. For example, write intensity may refer to an amount of data that is frequently requested to be written to a memory.

Figure 2:
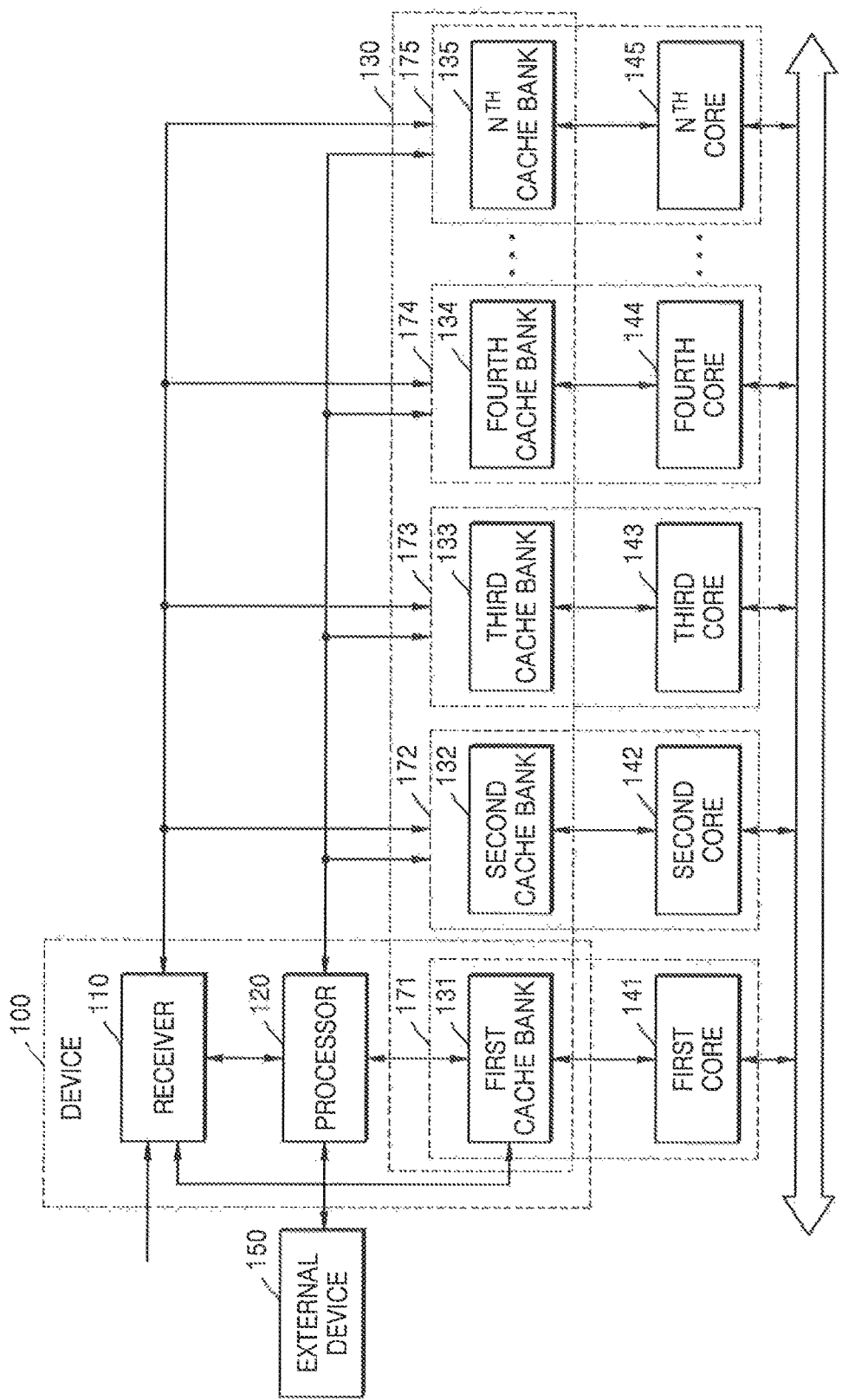
FIG. 2 is a block diagram of an operation of the device in a computing environment in which a plurality of cores operates according to an exemplary embodiment of the present inventive concept.

FIG. 2 is a block diagram of an operation of the device 100 in a computing environment in which a plurality of cores, e.g., first through $N^{th}$ cores 141 through 145, operates according to an exemplary embodiment of the present inventive concept.

The receiver 110 according to an exemplary embodiment of the present inventive concept may receive data to be stored in some cache banks, e.g., first through fourth cache banks 131 through 134, from among a plurality of cache banks, e.g., first through $N^{th}$ cache banks 131 through 135 respectively corresponding to the first through $N^{th}$ cores 141 through 145.

According to a distributed cache method, a cache 130 may include the first through $N^{th}$ cache banks 131 through 135. In addition, the device 100 may operate in a computing environment including the first through $N^{th}$ cores 141 through 145 and the first through $N^{th}$ cache banks 131 through 135.

The first through $N^{th}$ cache banks 131 through 135 may respectively correspond to the first through $N^{th}$ cores 141 through 145. For example, the first cache bank 131 may correspond to the first core 141, the second cache bank 132 may correspond to the second core 142, and the $N^{th}$ cache bank 135 may correspond to the $N^{th}$ core 145.

The receiver 110 may receive, from the outside of the device 100, data to be stored in some cache banks, e.g., the first through fourth cache banks 131 through 134, from among the first through $N^{th}$ cache banks 131 through 135. Determining which cache banks store the received data may be performed before or after the receiver 110 receives data. For example, the device 100 may obtain information about a remaining memory capacity of the second cache bank 132 before the receiver 110 receives data.

The device 100 may use some cache banks from among the plurality of cache banks to process data. For example, data processed in the first core 141 may be stored in the second cache bank 132.

The first cache bank 131 according to an exemplary embodiment of the present inventive concept may include a plurality of memories with different write characteristics. In addition, the first cache bank 131 may receive and store some of the data received by the receiver 110.

The first cache bank 131 may receive data from the receiver 110 or the processor 120, and the first cache bank 131 may store the data therein. The first cache bank 131 may store the received data in one memory from among the plurality of memories included in the first cache bank 131. The plurality of memories included in the first cache bank 131 may have different write characteristics. For example, the first cache bank 131 may have characteristics of a hybrid cache. The term 'hybrid cache' may refer to a cache including a plurality of memories with different attributes.

When write characteristics of the plurality of memories is different from each other, a latency time or energy required to write unit data may be different among the plurality of memories. Examples of the plurality of memories according to an exemplary embodiment of the present inventive concept may include volatile memories and non-volatile memories. Examples of the plurality of memories may include static random-access memories (SRAMs), spin transfer torque random-access memories (STT-RAMs), and phase change random-access memories (PCRAMs).

According to a write intensity of data received by the receiver 110, the processor 120 according to an exemplary embodiment of the present inventive concept may partition and transmit the received data to some cache banks, e.g., the first through fourth cache banks 131 through 134. The processor 120 according to an exemplary embodiment of the present inventive concept may partition and transmit data to some tiles, e.g., first through fourth tiles 171 through 174, from among a plurality of tiles, e.g., first through $N^{th}$ tiles 171 through 175. Each tile including a cache bank and a core may operate as a data processing unit. According to an exemplary embodiment of the present inventive concept, the first cache bank 131 or the first core 141 included in the first tile 171 may be used to process data of an application performed in the first tile 171.

Which cache banks from among the first through $N^{th}$ cache banks 131 through 135 store data, which is received by the receiver 110, may be determined according to an amount or an attribute of the data received by the receiver 110. For example, the processor 120 may determine the number of required cache banks to store the received data according to an amount or an attribute of data received by the receiver 110 and may distribute and transmit the received data to available cache banks from among the first through $N^{th}$ cache banks 131 through 135. The processor 120 may monitor the first through $N^{th}$ cache banks 131 through 135, may determine which cache banks, e.g., the first through fourth cache banks 131 through 134, are suitable to transmit data to, and may distribute and transmit data, received by the receiver 110, to the determined cache banks, e.g., the first through fourth cache banks 131 through 134.

When data received by the receiver 110 is distributed and transmitted to some cache banks, e.g., the first through fourth cache banks 131 through 134, an attribute of the data received by the receiver 110 may be used. For example, the processor 120 may distribute (e.g., partition) and transmit data based on a write intensity of the data received by the receiver 110.

The processor 120 according to an exemplary embodiment of the present inventive concept may partition and transmit received data so that writes are uniformly distributed to some cache banks, e.g., the first through fourth cache banks 131 through 134. For example, the processor 120 may partition and transmit received data so that a write intensive partition including data that is frequently requested to be written and a non-write intensive partition including data that is not frequently requested to be written are uniformly distributed to some cache banks, e.g., the first through fourth cache banks 131 through 134.

The meaning of 'uniform' might not refer to being physically uniform. The meaning of uniform may refer to uniformity within a preset error range. For example, when 100 pieces of data are uniformly distributed to the first, second and third cache banks 131, 132 and 133, the 100 pieces of data may be distributed within a preset error range so that, for example, 35, 32, and 33 pieces of data are respectively distributed to the first, second and third cache banks 131, 132 and 133.

In addition, the processor 120, according to an exemplary embodiment of the present inventive concept, may control the first cache bank 131 so that data transmitted to the first cache bank 131 is stored in one memory from among the plurality of memories included in the first cache bank 131, according to a write intensity of the data transmitted to the first cache bank 131.

The plurality of memories included in the first cache bank 131 may have different write characteristics. For example, the following will be explained on the assumption that a first memory and a second memory with different write characteristics from each other are included in the first cache bank 131, and the write characteristics of the first memory indicate a higher efficiency for writing data than the write characteristics of the second memory.

The first memory and the second memory included in the first cache bank 131 may have different write characteristics from each other. For example, a latency time or energy required to write unit data may be different among the first memory and the second memory. For example, a latency time or energy required to write unit data to the first memory may be less than a preset value, and a latency time or energy required to write unit data to the second memory may be equal to or greater than the preset value. The processor 120 according to an exemplary embodiment of the present inventive concept may store data with a high write intensity in the first memory, and may store data with a low write intensity in the second memory. The first cache bank 131 according to an exemplary embodiment of the present inventive concept may reduce consumed resources by sorting and storing data in the first memory or the second memory according to a write intensity. For example, when a latency time required to write unit data to the first memory is less than a latency time required to write unit data to the second memory, a latency time required to write data may be reduced by storing data with a high write intensity in the first memory. In addition, when energy required to write unit data to the first memory is less than energy required to write unit data to the second memory, energy consumed to write data may be reduced by storing data with a high write intensity in the first memory.

A case where data is stored in one memory from among a plurality of memories with different write characteristics according to a write intensity will be explained below in more detail with reference to FIG. 3.

The processor 120 according to an exemplary embodiment of the present inventive concept may output a data processing result to an external device 150. In addition, the processor 120 may receive data necessary for a data processing process from the external device 150, as well as the receiver 110.

According to an exemplary embodiment of the present inventive concept, when data output from the processor 120 is image data, the processor 120 may output the image data to the external device 150. The external device 150 may include a display. When the external device 150 is a display and data output from the processor 120 is image data, the external device 150 may receive the image data from the processor 120 and may display an image.

Although the device 100 is not included in the first tile 171 in FIG. 2, according to an exemplary embodiment of the present inventive concept, the device 100 may be included in the first tile 171. According to an exemplary embodiment of the present inventive concept, the receiver 110 and/or the processor 120 may be included in the first tile 171.

Although the processor 120 is separate from the first core 141 in FIG. 2, according to an exemplary embodiment of the present inventive concept, some or all functions of the processor 120 may be performed by the first core 141.

The device 100 according to an exemplary embodiment of the present inventive concept may scalably operate according to a distributed cache method. For example, as the number of used cores increases, performance may accordingly increase.

Figure 3:
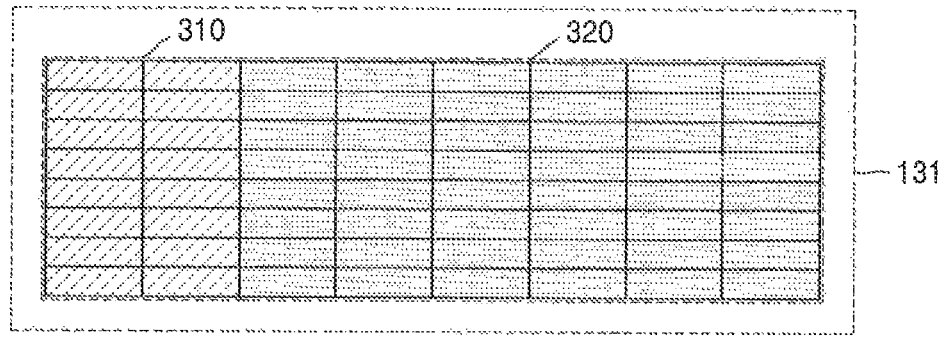
FIG. 3 is a diagram of a case in which the device stores data in a cache bank including a plurality of memories according to an exemplary embodiment of the present inventive concept.

FIG. 3 is a diagram of a case in which the device 100 stores data in a cache bank including a plurality of memories according to an exemplary embodiment of the present inventive concept.

The device 100 according to an exemplary embodiment of the present inventive concept may perform intra-bank optimization by sorting and storing data to be stored in a plurality of memories included in the cache bank according to an attribute of the data to be stored in the cache bank.

Referring to FIG. 3, for example, the following will be explained on the assumption that the first cache bank 131 includes a first memory 310 with write characteristics and a second memory 320 with write characteristics different from that of the first memory 310 will now be explained. For example, the write characteristics of the first memory may indicate a higher efficiency for writing data than the write characteristics of the second memory.

A latency time or energy required to write unit data to the first memory 310 with relatively high efficiency write characteristics may be equal to or less than a preset value. A latency time or energy required to write unit data to the second memory 320 with relatively low efficiency write characteristics may be greater than the preset value. For example, the first memory 310 may be an SRAM, and the second memory 320 may be an STT-RAM or a PCRAM. In addition, the first memory 310 may be a volatile memory, and the second memory 320 may be a non-volatile memory. The non-volatile memory may be an SIT-RAM, a ferroelectric random-access memory (FeRAM), a magnetic random-access memory (MRAM), or a phase change memory (PCM). An STT-RAM, that may operate at a high speed and low power, may have less energy consumption than that of other non-volatile memories (e.g., an FeRAM, an MRAM, and a PCM) and may use less write energy than that of other non-volatile memories. In addition, an STIT-RAM may have a higher endurance, a higher density, and a higher scalability than those of other non-volatile memories. For example, the device 100 may cause most write operations to be performed in an SRAM by storing write intensive data in the SRAM and storing non-write intensive data in an STT-RAM.

The device 100 may predict or determine a write intensity of data that is to be stored in the first cache bank 131, and may store the data in the first memory 310 or the second memory 320 according to a prediction or determination result. For example, the device 100 may store data whose write intensity is predicted to be equal to or greater than a preset value in the first memory 310 and may store data whose write intensity is predicted to be less than the preset value in the second memory 320. The device 100 may reduce a latency time or energy required to write the data by storing data, which has a high write intensity, in a memory with, for example, a lower latency time or lower energy required to write unit data to the memory (e.g., the first memory 310).

The first cache bank 131 according to an exemplary embodiment of the present inventive concept may be a cache bank of a hybrid cache according to a distributed cache method. Since the hybrid cache includes a plurality of memories with different attributes, the cache bank of the hybrid cache may include a plurality of memories with different attributes.

When the device 100 according to an exemplary embodiment of the present inventive concept stores data in the first memory 310 or the second memory 320 by predicting a write intensity of data to be stored, a method used in a prediction hybrid cache (PHC) may be used. For example, the device 100 may predict a write intensity of data to be stored based on a program counter. By using a write intensity history of data accessed by a first program counter, the device 100 according to an exemplary embodiment of the present inventive concept may predict a write intensity of data to be accessed next by the first program counter. When characteristics of pieces of data, which are accessed in response to the same instruction, are similar to each other, an accuracy of prediction of a write intensity may be increased. In addition, the device 100 may predict a write intensity of data to be stored based on an application to be predicted. By using a write intensity history of an application corresponding to data transmitted to the first cache bank 131, the device 100 according to an exemplary embodiment of the present inventive concept may determine a write intensity of the data transmitted to the first cache bank 131.

Figure 4:
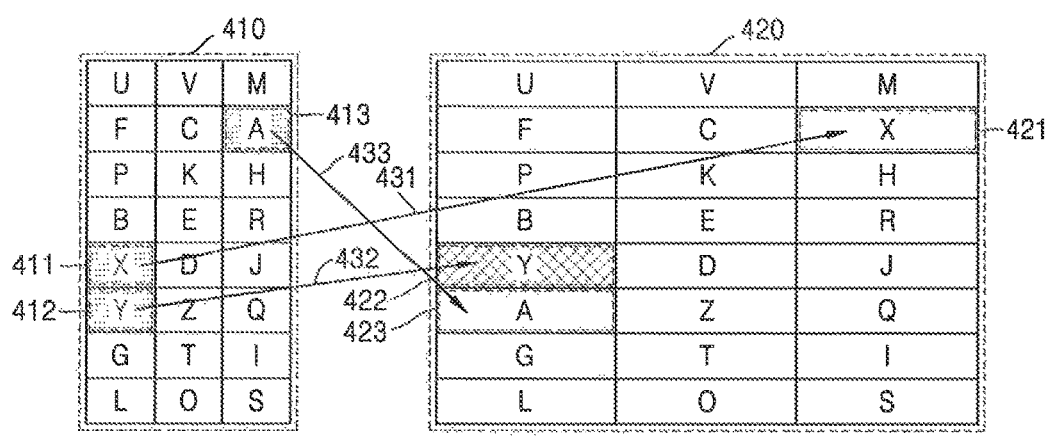
FIG. 4 is a diagram of a case in which the device processes data by using a pointer according to an exemplary embodiment of the present inventive concept.

FIG. 4 is a diagram of a case in which the device 100 processes data by using a pointer according to an exemplary embodiment of the present inventive concept.

The term 'pointer' may refer to a tag-to-data pointer. A cache or a cache bank may include a tag area 410 and a data area 420. The tag area 410 may include information about data stored in the data area 420. For example, the tag area 410 may store information about a validity, an access time, and an address of data stored in the data area 420. For example, a first tag 411 may include information of first data 421, a second tag 412 may include information of second data 422, and a third tag 413 may include information of third data 423. In addition, a pointer may include information for matching a tag and data. For example, a first pointer 431 may match the first tag 411 to the first data 421, a second pointer 432 may match the second tag 412 to the second data 422, and a third pointer 433 may match the third tag 413 to the third data 423.

The device 100 according to an exemplary embodiment of the present inventive concept may reduce the number of data write operations by updating one or more tags stored in the tag area 410 or by updating pointers. For example, when locations of pieces of data are to be exchanged in the data area 420, the device 100 according to an exemplary embodiment of the present inventive concept may obtain data location exchange effects by updating only pointers without updating locations of pieces of data stored in the data area 420. In addition, when data is to be written to a specific location, the device 100 according to an exemplary embodiment of the present inventive concept may write new data to a location of data to be deleted, and the device 100 may update a value of a tag or a pointer, without sequentially moving pieces of data. In this case, locations of pieces of data may be updated by updating tags or pointers.

Figure 5:
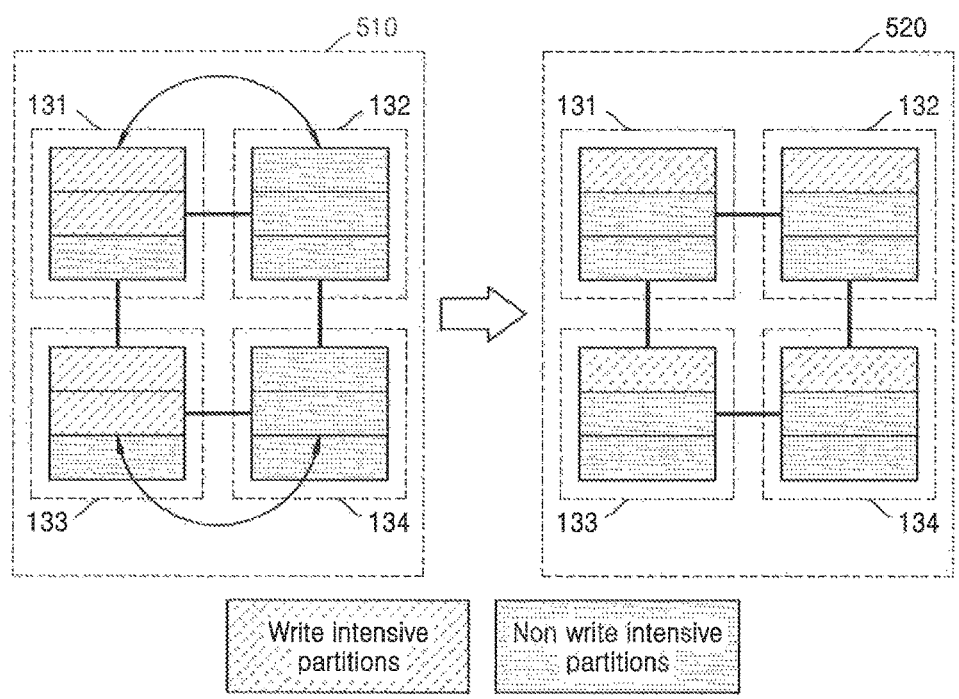
FIG. 5 is a diagram of a case in which the device partitions and stores data in a plurality of cache banks according to an exemplary embodiment of the present inventive concept.

FIG. 5 is a diagram of a case in which the device 100 partitions and stores data in a plurality of cache banks according to an exemplary embodiment of the present inventive concept.

The device 100 according to an exemplary embodiment of the present inventive concept may partition and transmit data to some cache banks, e.g., the first through fourth cache banks 131 through 134, from among a plurality of cache banks. When the device 100 transmits data to the cache banks (e.g., 131 through 134), the device 100 may perform inter-bank optimization by partitioning data according to a write intensity of the data to be transmitted, and by transmitting the data to some cache banks, e.g., the first through fourth cache banks 131 through 134. For example, the device 100 may increase an SRAM usage of an entire cache by replacing data of a cache bank with a low SRAM usage with data of a cache bank with a high SRAM usage. Accordingly, the device 100 may move data between cache banks. In addition, the device 100 may partition and transmit data to cache banks by using a preset method.

Referring to FIG. 5, a first case 510 where data is partitioned and transmitted irrespective of a write intensity and a second case 520 where data is partitioned and transmitted in consideration of a write intensity will now be explained.

When data is partitioned and transmitted irrespective of a write intensity as in the first case 510, write intensities of pieces of data respectively stored in some cache banks, e.g., the first through fourth cache banks 131 through 134, may be different from one another. For example, each of the first cache bank 131 and the third cache bank 133 may include two partitions with a high write intensity, and each of the second cache bank 132 and the fourth cache bank 134 might not include a partition with a high write intensity. The term 'partition' according to an exemplary embodiment of the present inventive concept may refer to a logical cache data group. For example, each partition may include data accessed by one application.

However, when data is partitioned and transmitted according to a write intensity as in the second case 520, write intensities of pieces of data respectively stored in some cache banks, e.g., the first through fourth cache banks 131 through 134, may be uniform. For example, each of the first cache bank 131 through the fourth cache bank 134 may include one partition with a high write intensity. As described above, the meaning of 'uniform' may refer to uniformity within a preset error range, instead of being physically uniform.

Figure 6:
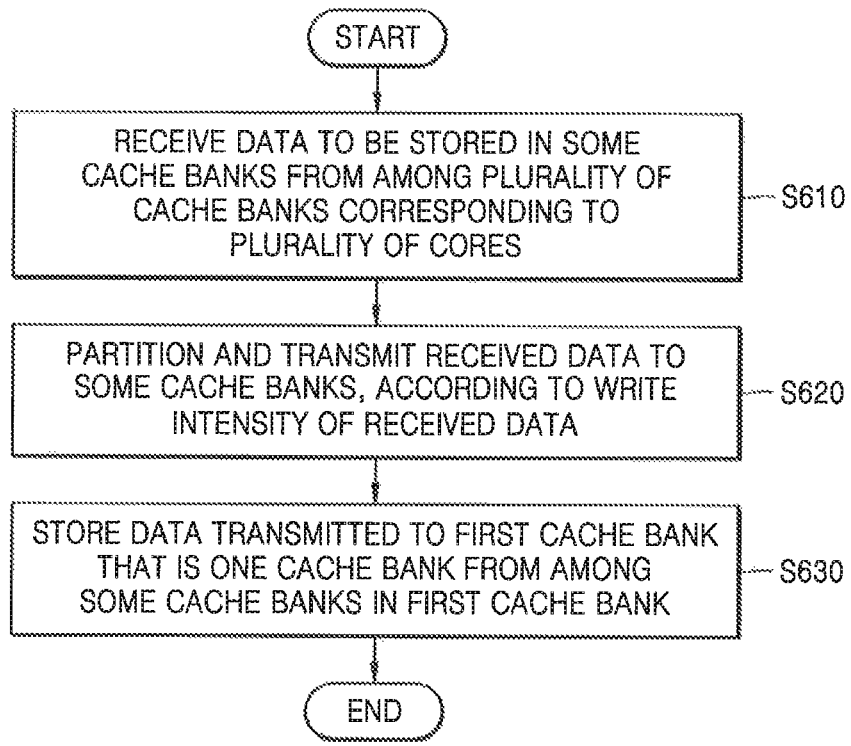
FIG. 6 is a flowchart of a case in which the device transmits and stores data in a computing environment in which a plurality of cores operate according to an exemplary embodiment of the present inventive concept.

FIG. 6 is a flowchart of a case in which the device 100 transmits and stores data in a computing environment in which a plurality of cores operate according to an exemplary embodiment of the present inventive concept.

In operation S610, the device 100 according to an exemplary embodiment of the present inventive concept receives data to be stored in some cache banks from among a plurality of cache banks corresponding to a plurality of cores.

The device 100 may operate in a computing environment including the plurality of cores and the plurality of cache banks. The plurality of cache banks may correspond to the plurality of cores.

The device 100 according to an exemplary embodiment of the present inventive concept may receive data to be processed from outside (e.g., an external device) of the device 100. In addition, the device 100 may determine which cache banks are to be used from among the plurality of cache banks by analyzing the received data received from outside of the device 100. Further, the device 100 may transmit the received data to the determined cache banks from among the plurality of cache banks.

In operation S620, the device 100 according to an exemplary embodiment of the present inventive concept partitions and transmits the received data to the determined cache banks (e.g., some of the cache banks) according to a write intensity of the data received in operation S610.

When the device 100 according to an exemplary embodiment of the present inventive concept transmits data, the device 100 may perform inter-bank optimization by partitioning data according to a write intensity of the data that is to be transmitted, and by transmitting the data to the determined cache banks.

Since the device 100 partitions and transmits data according to a write intensity, write intensities of pieces of data stored in the determined cache banks may be uniform. As described above, the meaning of 'uniform' may refer to uniformity within a predetermined error range, instead of physical uniformity.

In addition, the device 100 according to an exemplary embodiment of the present inventive concept may partition and transmit data based on a write intensity and a condition of the determined cache banks to which the data is to be transmitted. For example, in a case in which write intensive data is being transmitted to a cache bank including a memory with relatively low efficiency write characteristics, the device 100 may determine an amount of the write intensive data being transmitted to be less than an average value. In addition, in a case in which write intensive data is being transmitted to a cache bank including a memory with relatively high efficiency write characteristics, the device 100 may determine an amount of write intensive data being transmitted to be greater than the average value.

In operation S630, the device 100, according to an exemplary embodiment of the present inventive concept, stores data transmitted to a first cache bank, among the determined cache banks, in the first cache bank. The first cache bank may be one cache bank from among a plurality of cache banks constituting a cache.

In addition, the processor 120, according to an exemplary embodiment of the present inventive concept, may control the first cache bank to store the transmitted data in one memory from among a plurality of memories included in the first cache bank, according to a write intensity of the data transmitted to the first cache bank.

The device 100 according to an exemplary embodiment of the present inventive concept may perform intra-bank optimization by sorting and storing data to be stored in the first cache bank in the plurality of memories included in the first cache bank according to an attribute of the data to be stored in the first cache bank.

For example, the device 100 may predict a write intensity of data received by the first cache bank, and may store the data received by the first cache bank in one memory from among the plurality of memories included in the first cache bank according to a prediction result. When a predicted write intensity of data that is to be stored is equal to or greater than a preset value, the device 100 may store the data in a memory having relatively high efficiency write characteristics from among the plurality of memories included in the first cache bank. When a write intensity of data to be stored is less than the preset value, the device 100 may store the data in a memory with relatively low efficiency write characteristics from among the plurality of memories included in the first cache bank. A latency time or energy required to write unit data to a memory with relatively high efficiency write characteristics may be less than a latency time or energy required to write unit data to a memory with relatively low efficiency write characteristics.

In addition, the device 100 may store data received by the first cache bank in one memory from among the plurality of memories included in the first cache bank by using a method used in a PHC.

Figure 7:
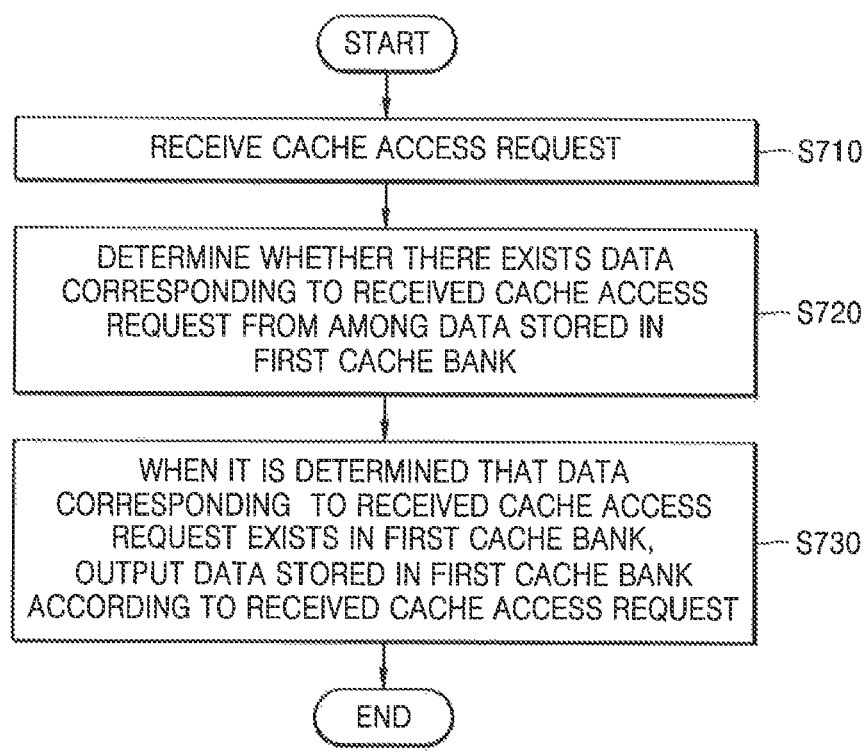
FIG. 7 is a flowchart of a case in which the device outputs data according to a cache access request according to an exemplary embodiment of the present inventive concept.

FIG. 7 is a flowchart of a case in which the device 100 outputs data according to a cache access request according to an exemplary embodiment of the present inventive concept.

In operation S710, the device 100 according to an exemplary embodiment of the present inventive concept receives a cache access request. For example, the device 100 may receive a request for obtaining data stored in a cache.

In operation S720, the device 100 according to an exemplary embodiment of the present inventive concept determines whether there exists data corresponding to the cache access request received in operation S710 from among data stored in a first cache bank. For example, the device 100 may determine whether access to the first cache bank is necessary according to the cache access request received in operation S710. The first cache bank in FIG. 7 may refer to one cache bank from among a plurality of cache banks according to a distributed cache method.

When it is determined in operation S720 that the data corresponding to the cache access request received in operation S710 exists in the first cache bank, in operation S730, the device 100 according to an exemplary embodiment of the present inventive concept outputs the data stored in the first cache bank according to the cache access request received in operation S710. For example, the device 100 may output the data stored in the first cache bank to an external device (e.g., 150 shown in FIG. 2) according to the cache access request received in operation S710.

When the output data is image data according to an exemplary embodiment of the present inventive concept, the device 100 may output the image data to a display. The display may receive the image data from the device 100 and may display the image data.

Figure 8:
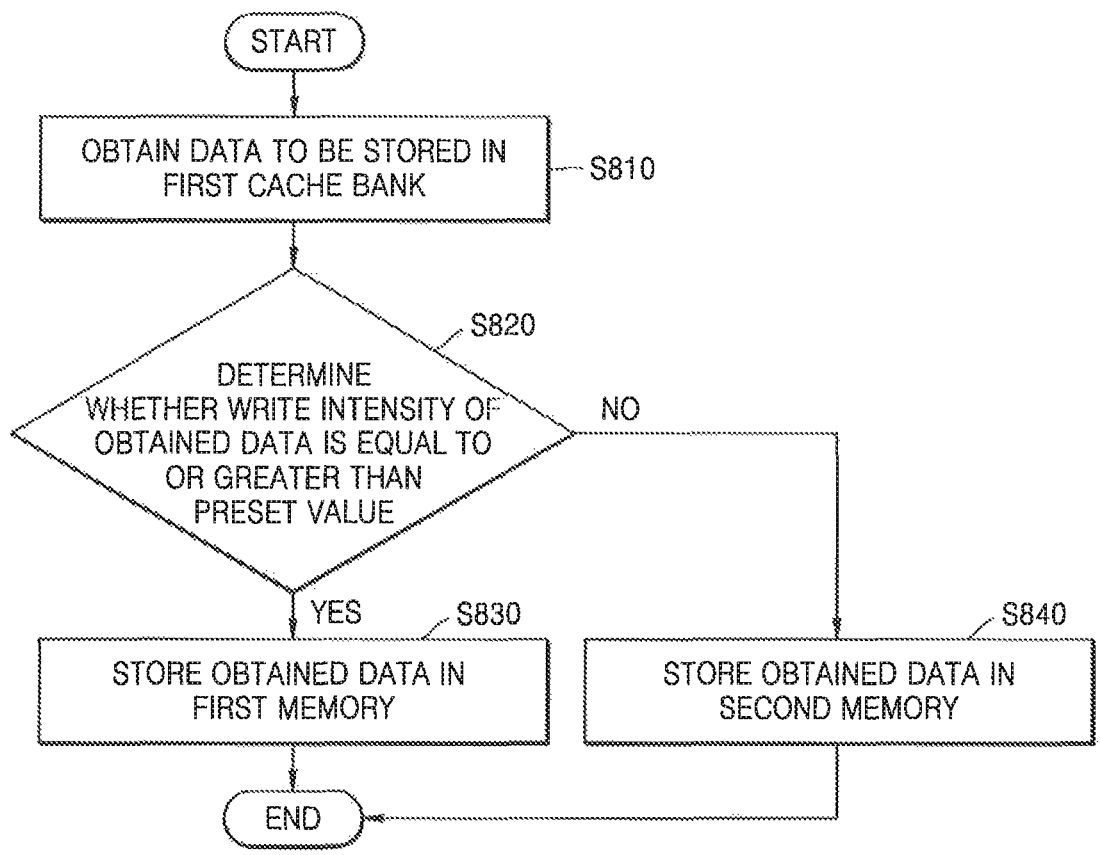
FIG. 8 is a flowchart of a case in which the device stores obtained data in a memory determined according to a write intensity of the obtained data from among a plurality of memories according to an exemplary embodiment of the present inventive concept.

FIG. 8 is a flowchart of a case in which the device 100 stores obtained data in a memory determined according to a write intensity of the obtained data from among a plurality of memories according to an exemplary embodiment of the present inventive concept.

In operation S810, the device 100, according to an exemplary embodiment of the present inventive concept, obtains data to be stored in a first cache bank. For example, the device 100 may determine the data to be stored in the first cache bank from among data received from outside of the device 100.

In operation S820, the device 100 according to an exemplary embodiment of the present inventive concept determines whether a write intensity of the data obtained in operation S810 is equal to or greater than a preset value.

The device 100 according to an exemplary embodiment of the present inventive concept may predict the write intensity of the data obtained in operation S810 by using a prediction algorithm and may determine whether the predicted write intensity is equal to or greater than the preset value.

For example, by using a write intensity history of data accessed by a program counter corresponding to data transmitted to the first cache bank, the device 100 may determine a write intensity of the data transmitted to the first cache bank. In addition, the device 100 may determine whether the write intensity, which is determined according to the write intensity history of the data accessed by the program counter, is equal to or greater than a preset value.

In addition, by using a write intensity history of an application corresponding to the data transmitted to the first cache bank, the device 100 may determine a write intensity of the data transmitted to the first cache bank. Further, the device 100 may determine whether the write intensity, which is determined according to the write intensity history of the application, is equal to or greater than a preset value.

The following will be explained on the assumption that write characteristics of a first memory 310 indicate a higher efficiency for writing data than write characteristics of a second memory 320.

In operation S830, the device 100, according to an exemplary embodiment of the present inventive concept, stores the data obtained in operation S810 in the first memory 310.

Since the write characteristics of the first memory 310 have a higher efficiency for writing data than that of the second memory 320, a latency time or energy required to write unit data to the first memory 310 may be less than a latency time or energy required to write unit data to the second memory 320. For example, the first memory 310 may be an SRAM, and the second memory 320 may be an STT-RAM or a PCRAM. Alternatively, the first memory 310 may be a volatile memory, and the second memory may be a non-volatile memory.

The device 100 according to an exemplary embodiment of the present inventive concept may reduce a latency time or energy required to store data by storing data, which has a write intensity equal to or greater than a preset value, in the first memory 310.

In operation S840, the device 100, according to an exemplary embodiment of the present inventive concept, stores the data obtained in operation S810 in the second memory 320.

The device 100, according to an exemplary embodiment of the present inventive concept, may reduce a latency time or energy required to store data by storing data, which has a write intensity less than the preset value in the second memory 320.

Figure 9:
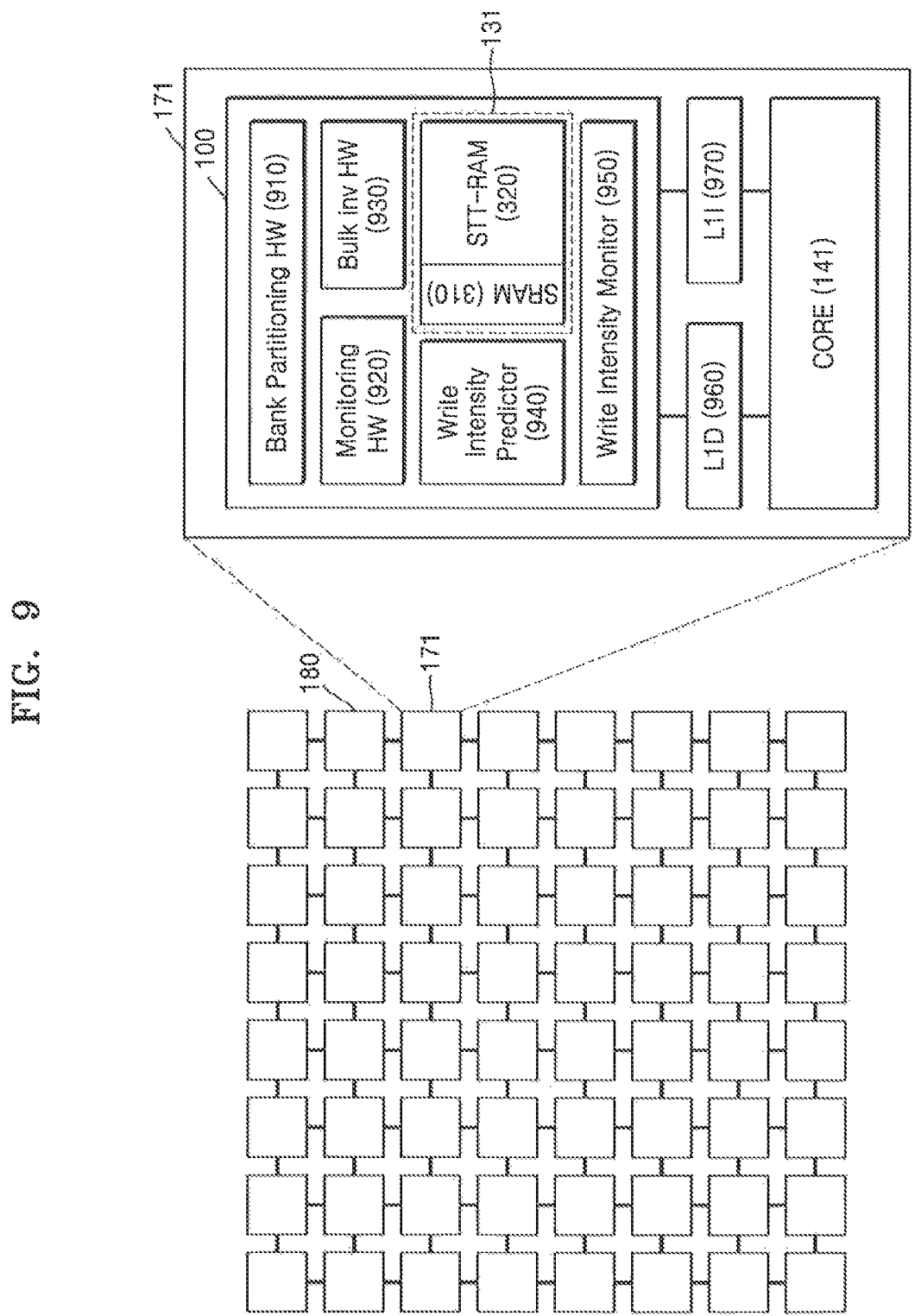
FIG. 9 is a block diagram of an operation of the device in a computing environment in which a plurality of tiles operates according to an exemplary embodiment of the present inventive concept.

FIG. 9 is a block diagram of an operation of the device 100 in a computing environment in which a plurality of tiles operates according to an exemplary embodiment of the present inventive concept.

The device 100 according to an exemplary embodiment of the present inventive concept may operate in a computing environment in which a plurality of tiles operates. For example, the device 100 may operate in a computing environment in which a plurality of tiles including the first tile 171 and a second tile 180 operates.

The device 100 according to an exemplary embodiment of the present inventive concept may be included in the first tile 171. Referring to FIG. 9, the device 100 may include bank partitioning hardware 910, a monitoring hardware 920, a bulk invalidation hardware 930, a write intensity predictor 940, a write intensity monitor 950, and the first cache bank 131.

Although it is illustrated in FIG. 9 that the device 100 includes elements related to the present embodiment, it will be understood by one of ordinary skill in the art that the device 100 may further include general-purpose elements other than the elements illustrated in FIG. 9. In addition, it will be understood by one of ordinary skill in the art that some elements from among the elements illustrated in FIG. 9 may be omitted.

The device 100 according to an exemplary embodiment of the present inventive concept may efficiently use a hybrid cache in a distributed cache. For example, the device 100 may use a hybrid cache according to a distributed cache method.

The bank partitioning hardware 910 according to an exemplary embodiment of the present inventive concept may partition data. For example, the bank partitioning hardware 910 may allocate a cache size to an application that is to be executed. The bank partitioning hardware 910 may maintain the cache size allocated to each application through partitioning. The bank partitioning hardware 910 may prevent interference in a cache structure in which a plurality of cores is used, through partitioning.

The monitoring hardware 920 according to an exemplary embodiment of the present inventive concept may monitor characteristics of a cache or data. The monitoring hardware 920 may monitor operational characteristics of a cache. The device 100 according to an exemplary embodiment of the present inventive concept may increase the performance of an application that is being performed through partitioning decision based on operational characteristics (e.g., a miss change according to a cache size) of each application. The partitioning decision is obtained by using a result obtained after monitoring the operational characteristics of the cache. The monitoring hardware 920 may monitor a cache size required by each application.

The bulk invalidation hardware 930 according to an exemplary embodiment of the present inventive concept may invalidate data that is determined to be unnecessary. For example, the bulk invalidation hardware 930 may invalidate data that is determined to be unnecessary in a process of periodically updating a cache size. The bulk invalidation hardware 930 of the device 100 may be omitted if necessary.

The write intensity predictor 940 according to an exemplary embodiment of the present inventive concept may be used in an intra-bank optimization process. For example, the write intensity predictor 940 may predict or determine a write intensity of data to be stored in the first cache bank 131.

The write intensity predictor 940 according to an exemplary embodiment of the present inventive concept may use a method used in a PHC to predict a write intensity of data to be stored. For example, the write intensity predictor 940 may predict a write intensity of data to be stored based on a program counter. By using a write intensity history of data accessed by a second program counter, the write intensity predictor 940 may predict a write intensity of data to be accessed next by the second program counter. When characteristics of pieces of data, which are accessed in response to the same instruction, are similar to each other, an accuracy of prediction of a write intensity may be increased. In addition, the write intensity predictor 940 may predict a write intensity of data to be stored based on an application to be predicted. By using a write intensity history of an application corresponding to data transmitted to the first cache bank 131, the write intensity predictor 940, according to an exemplary embodiment of the present inventive concept, may determine a write intensity of the data transmitted to the first cache bank 131.

The write intensity monitor 950, according to an exemplary embodiment of the present inventive concept, may be used in an inter-bank optimization process by monitoring a write intensity of data. For example, data may be distributed and transmitted according to a monitoring result of the write intensity monitor 950. The write intensity monitor 950 may be used to determine write characteristics of different applications that are simultaneously performed, and may be used to distribute data so that write characteristics of data stored in cache banks (e.g., first through $N^{th}$ cache banks 131 through 135, as shown in FIG. 2) are similar to one another.

The write intensity monitor 950 may monitor which application frequently uses write intensive data. The write intensity monitor 950 may determine and store the number of times a data write operation occurs on data while the data is stored in a cache. The stored number of times a data write operation occurs on data while the data is stored in a cache may be used to periodically update a data location. For example, the write intensity monitor 950 may monitor a write intensity of each application in each cache bank. In addition, a monitoring result may be used to allocate data to cache banks so that writes are uniformly distributed to the cache banks.

The first cache bank 131 according to an exemplary embodiment of the present inventive concept may include a plurality of memories. For example, the first cache bank 131 may include the first memory 310 having relatively high efficiency write characteristics and the second memory 320 having relatively low efficiency write characteristics, as shown in FIG. 3.

Referring to FIG. 9, a first memory 960 and a second memory 970 may be connected to the device 100. The first memory 960 and the second memory 970 may be level-1 memories. In addition, the first memory 960 and the second memory 970 may be connected to the first core 141 and may be used to process data. The first memory 960 and the second memory 970 may be located outside the device 100.

Although the device 100 is included in the first tile 171 in FIG. 9, according to an exemplary embodiment of the present inventive concept, the device 100 might not be included in the first tile 171.

In addition, although the first core 141 is located outside the device 100, according to an exemplary embodiment of the present inventive concept, the first core 141 may be located inside the device 100.

The device 100 according to an exemplary embodiment of the present inventive concept may scalably operate by using a distributed cache method. For example, the device 100 may operate in a computing environment in which 128, 256, 512, or 1024 tiles are used, unlike in FIG. 9.

Figure 10:
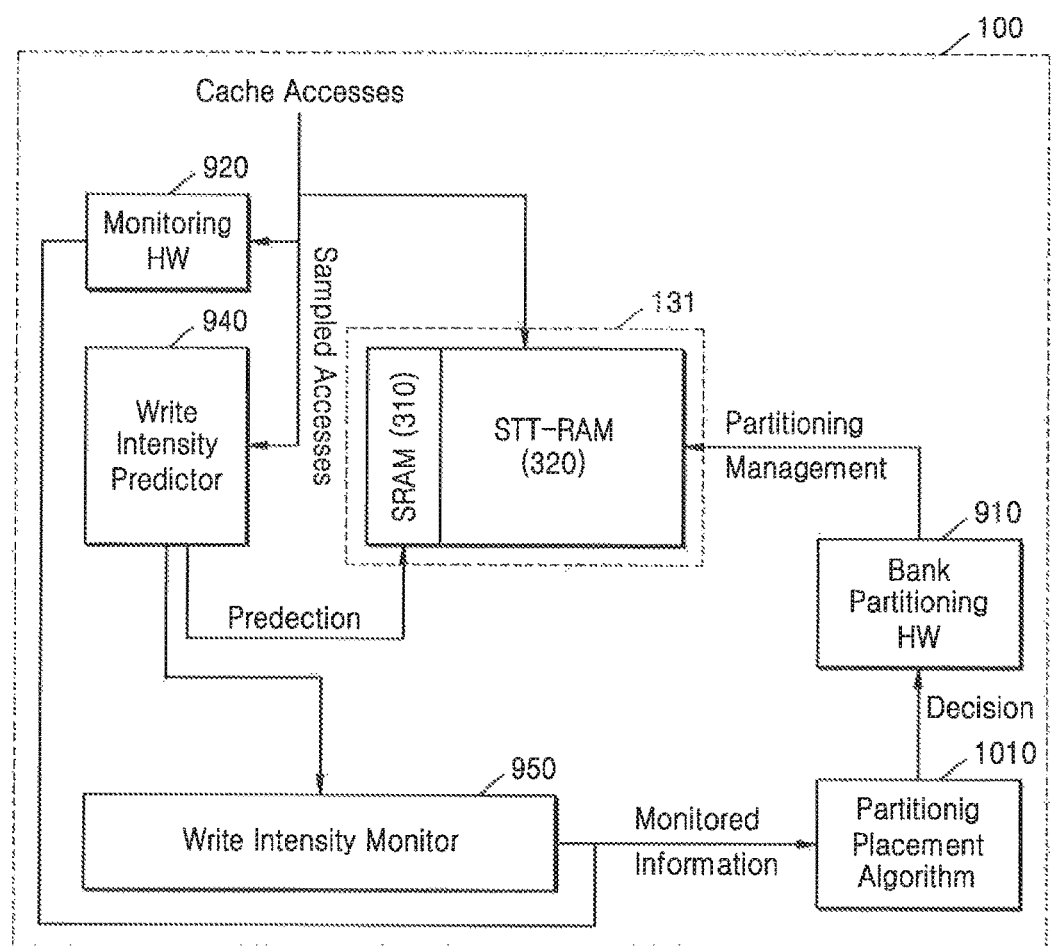
FIG. 10 is a block diagram of a case in which the device processes data by predicting or monitoring a write intensity according to an exemplary embodiment of the present inventive concept.

FIG. 10 is a block diagram of a case in which the device 100 processes data by predicting or monitoring a write intensity according to an exemplary embodiment of the present inventive concept.

Referring to FIG. 10, the device 100 may include the bank partitioning hardware 910, the monitoring hardware 920, the write intensity predictor 940, the write intensity monitor 950, the first cache bank 131, and a partitioning placement algorithm 1010.

The bank partitioning hardware 910, the monitoring hardware 920, the write intensity predictor 940, the write intensity monitor 950, and the first cache bank 131 have been described above, and thus a detailed explanation thereof might not be given.

The partitioning placement algorithm 1010 may operate as a separate element, or may be provided as an algorithm in the processor 120.

The partitioning placement algorithm 1010 according to an exemplary embodiment of the present inventive concept may receive a monitoring result (e.g., monitoring information) from the write intensity monitor 950. The partitioning placement algorithm 1010 may transmit data indicating a partitioning result about how to perform partitioning to the bank partitioning hardware 910.

According to an exemplary embodiment of the present inventive concept, the write intensity predictor 940 and the first cache bank 131 may operate similar to the operation in a PHC. For example, data may be stored in one memory from among a plurality of memories included in the first cache bank 131 according to a prediction result of the write intensity predictor 940.

According to an exemplary embodiment of the present inventive concept, a non-transitory computer-readable recording medium may have embodied thereon a program for executing methods described herein.

The device described herein may comprise a processor, a memory for storing program data and executing it, a permanent storage unit such as a disk drive, a communications port for handling communications with external devices, and user interface devices, including a touch panel, keys, buttons, etc. When software modules or algorithms are involved, these software modules may be stored on a computer-readable medium as program instructions or computer-readable codes executable by a processor. Examples of the computer-readable recording medium include magnetic storage media (e.g., ROM, floppy disks, hard disks, etc.), and optical recording media (e.g., CD-ROMs, or DVDs). The computer-readable recording medium can also be distributed over network coupled computer systems so that the computer-readable code is stored and executed in a distributive manner. This media can be read by the computer, stored in the memory, and executed by the processor.

The present inventive concept may be described in terms of functional block components and various processing steps. Such functional blocks may be realized by any number of hardware and/or software components configured to perform specified functions. For example, the present inventive concept may employ various integrated circuit (IC) components, e.g., memory elements, processing elements, logic elements, look-up tables, and the like, which may carry out a variety of functions under the control of one or more microprocessors or other control devices. Similarly, where the elements of the present inventive concept are implemented using software programming or software elements, the present inventive concept may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the present inventive concept could employ any number of conventional techniques for electrical configuration, signal processing and/or control, data processing and the like. The words "mechanism", "element", "means", and "configuration" may be used broadly and are not limited to mechanical or physical exemplary embodiments, but can include software routines in conjunction with processors, etc.

The exemplary embodiments of the present inventive concepts shown and described herein are illustrative examples of the present inventive concept and are not intended to otherwise limit the scope of the present inventive concept in any way. For the sake of brevity, conventional electronics, control systems, software development and other functional aspects of the systems might not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be included in a device according to exemplary embodiments of the present inventive concept.

It will be understood that the steps of all methods described herein can be performed in any suitable order unless otherwise indicated herein or otherwise clearly contradicted by context. The present inventive concept is not limited to the described order of the steps.

While the present inventive concept has been particularly shown and described with reference to exemplary embodiments thereof, it will be apparent to those of ordinary skill in the art that various changes in form and detail may be made thereto without departing from the spirit and scope of the present inventive concept.

What is claimed is:

1. A method of processing data comprising:
 receiving data to be stored in a first group of cache banks from among a plurality of cache banks corresponding to a plurality of cores;
 partitioning the received data and transmitting the partitioned data to the first group of cache banks according to a write intensity of the received data; and
 storing a portion of the transmitted data in a first cache bank from among the first group of cache banks.

2. The method of claim 1, wherein the storing of the portion of the transmitted data in the first cache bank comprises storing the portion of the transmitted data in one memory from among a plurality of memories included in the first cache bank, according to a write intensity of the portion of the transmitted data received by the first cache bank, wherein the plurality of memories includes different write characteristics.

3. The method of claim 1, further comprising:
 receiving a cache access request; and
 outputting the portion of the transmitted data stored in the first cache bank according to the received cache access request.

4. The method of claim 1, wherein the partitioning of the received data and the transmitting of the partitioned data to the first group of cache banks comprises partitioning the received data and transmitting the partitioned data to the first group of cache banks so that writes are uniformly distributed to the first group of cache banks.

5. The method of claim 2, wherein the plurality of memories comprises a first memory and a second memory, wherein the first memory includes a latency time or energy to write unit data that is less than a first preset value, and the second memory includes a latency time or energy to write unit data that is equal to or greater than the first preset value.

6. The method of claim 5, wherein the storing of the portion of the transmitted data in the first cache bank comprises,
 when the write intensity of the portion of the transmitted data received by the first cache bank is less than a second preset value, storing the portion of the transmitted data in the second memory.

7. The method of claim 5, wherein the storing of the portion of the transmitted data in the first cache bank comprises,
 when the write intensity of the portion of the transmitted data received by the first cache bank is greater than a second preset value, storing the portion of the transmitted data in the first memory.

8. The method of claim 5, wherein the second memory comprises at least one from among spin transfer torque random-access memory (STT-RAM) and phase change random-access memory (PCRAM), and the first memory comprises static random-access memory (SRAM).

9. The method of claim 2, further comprising determining the write intensity of the portion of the transmitted data received by the first cache bank by using a write intensity history of data accessed by a program counter corresponding to the portion of the transmitted data received by the first cache bank.

10. The method of claim 2, further comprising determining the write intensity of the portion of the transmitted data received by the first cache bank by using a write intensity history of an application corresponding to the portion of the transmitted data received by the first cache bank.

11. A device for processing data comprising:
 a receiver configured to receive data to be stored in a first group of cache banks from among a plurality of cache banks corresponding to a plurality of cores;
 a processor configured to partition the received data and to transmit the partitioned data to the first group of cache banks according to a write intensity of the received data; and
 a first cache bank configured to store a portion of the transmitted data, wherein the first cache bank is from among the first group of cache banks.

12. The device of claim 11, wherein the first cache bank is further configured to store the portion of the transmitted data in one memory from among a plurality of memories included in the first cache bank, according to a write intensity of the portion of the transmitted data received by the first cache bank, wherein the plurality of memories includes different write characteristics.

13. The device of claim 11, wherein
the receiver is further configured to receive a cache access request, and
the processor is further configured to output the data stored in the first cache bank according to the received cache access request.

14. The device of claim 11, wherein the processor is further configured to partition the received data and to transmit the partitioned data to the first group of cache banks so that writes are uniformly distributed to the first group of cache banks.

15. A non-transitory computer-readable recording medium having embodied thereon a program for executing the method of claim 1.

16. A method of processing data comprising:
receiving data by using a receiver;
dividing the received data and transmitting the divided data to a first group of cache banks of a plurality of cache banks; and
storing a portion of the transmitted data in one memory of a plurality of memories included in a first cache bank of the first group of cache banks based on a write intensity of the portion of the transmitted data.

17. The method of claim 16, wherein the plurality of cache banks corresponds to a plurality of cores.

18. The method of claim 16, wherein the plurality of memories comprises a first memory and a second memory with different write characteristics from each other.

19. The method of claim 18, wherein a latency time and energy for writing unit data is different among the first memory and the second memory.

20. The method of claim 19, wherein the storing of the portion of the transmitted data in one memory of the plurality of memories included in the first cache bank comprises storing the portion of the transmitted data in the first memory when the write intensity of the portion of the transmitted data is greater than or equal to a preset value, and
storing the portion of the transmitted data in the second memory when the write intensity of the portion of the transmitted data is less than the preset value.

* * * * *